US011333059B2

(12) United States Patent
Woo et al.

(10) Patent No.: US 11,333,059 B2
(45) Date of Patent: May 17, 2022

(54) DYNAMIC CONTROL FOR VEHICLE COOLANT

(71) Applicant: Ford Global Technologies, LLC, Dearborn, MI (US)

(72) Inventors: Jason Joseph Woo, Northville, MI (US); Jeremy Lerner, Southfield, MI (US); Scott Huggins, Novi, MI (US); Taylor Hawley, Dearborn, MI (US); Timothy D. Zwicky, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/074,935

(22) Filed: Oct. 20, 2020

(65) Prior Publication Data

US 2022/0120207 A1 Apr. 21, 2022

(51) Int. Cl.

| | |
|---|---|
| ***B60W 40/02*** | (2006.01) |
| ***B60K 11/06*** | (2006.01) |
| ***F01P 11/10*** | (2006.01) |
| ***F01P 5/06*** | (2006.01) |
| ***F01P 5/04*** | (2006.01) |
| ***G08G 1/052*** | (2006.01) |

(52) U.S. Cl.

CPC .................. *F01P 5/06* (2013.01); *F01P 5/04* (2013.01); *G08G 1/052* (2013.01)

(58) Field of Classification Search

CPC .. B60W 40/02; B60W 40/09; B60W 50/0097; B60W 50/04; B60K 11/06; B60K 6/24; F01P 11/10; F01P 7/167

See application file for complete search history.

(56) References Cited

U.S. PATENT DOCUMENTS

| | | | | |
|---|---|---|---|---|
| 7,347,168 B2 | 3/2008 | Reckels et al. | | |
| 7,506,619 B1 * | 3/2009 | Lak | F02B 67/04 | 123/195 A |
| 7,953,530 B1 | 5/2011 | Pederson et al. | | |
| 9,822,691 B2 | 11/2017 | Johansson et al. | | |
| 10,472,877 B2 | 11/2019 | Dudar et al. | | |
| 2003/0183433 A1 * | 10/2003 | MacKelvie | G01P 5/04 | 180/68.1 |
| 2004/0103862 A1 * | 6/2004 | Aidnik | F01P 7/164 | 123/41.29 |

(Continued)

OTHER PUBLICATIONS

Wang et al., "Model Predictive Climate Control of Connected and Automated Vehicles for Improved Energy Efficiency", 2018 Annual American Control Conference (ACC) Jun. 27-29, 2018. Wisconsin Center, Milwaukee, USA.

*Primary Examiner* — Long T Tran

(74) *Attorney, Agent, or Firm* — Frank A. MacKenzie; Bejin Bieneman PLC

(57) ABSTRACT

A system comprising a computer including a processor and a memory, the memory including instructions such that the processor is programmed to: receive at least one of expected upcoming traffic behavior or actual upcoming traffic behavior corresponding to an upcoming segment of a roadway being traversed by a vehicle; adjust a radiator hysteresis timer based on the expected upcoming traffic behavior or the actual upcoming traffic behavior; and transmit a control signal to an actuator to actuate a radiator fan based on the adjusted radiator hysteresis timer.

20 Claims, 6 Drawing Sheets

(56) References Cited

U.S. PATENT DOCUMENTS

| | | | | |
|---|---|---|---|---|
| 2006/0086113 | A1* | 4/2006 | Errington | B60H 1/3208 62/181 |
| 2007/0261648 | A1* | 11/2007 | Reckels | F01P 7/167 123/41.12 |
| 2008/0127913 | A1* | 6/2008 | Justin | F01P 3/2207 123/41.2 |
| 2011/0153140 | A1 | 6/2011 | Datta et al. | |
| 2011/0160964 | A1* | 6/2011 | Obradovich | H04L 43/08 701/41 |
| 2019/0031199 | A1* | 1/2019 | Dudar | B60W 10/30 |
| 2019/0140578 | A1 | 5/2019 | Lee | |
| 2020/0376927 | A1* | 12/2020 | Rajaie | B60H 1/00885 |
| 2020/0393255 | A1* | 12/2020 | Freese | G01C 21/3484 |
| 2021/0041869 | A1* | 2/2021 | Meyer | G05D 1/0287 |

* cited by examiner

DYNAMIC CONTROL FOR VEHICLE COOLANT

BACKGROUND

Motor vehicles typically include a radiator that receives coolant from the heat exchanger after the coolant has absorbed heat from the intake air passing through the heat exchanger. The radiator typically includes a fan that blows air past the heated coolant to decrease the temperature of the coolant before the coolant is returned to the heat exchanger. The pump circulates coolant through the heat exchanger and the radiator.

DETAILED DESCRIPTION

Figure 1:
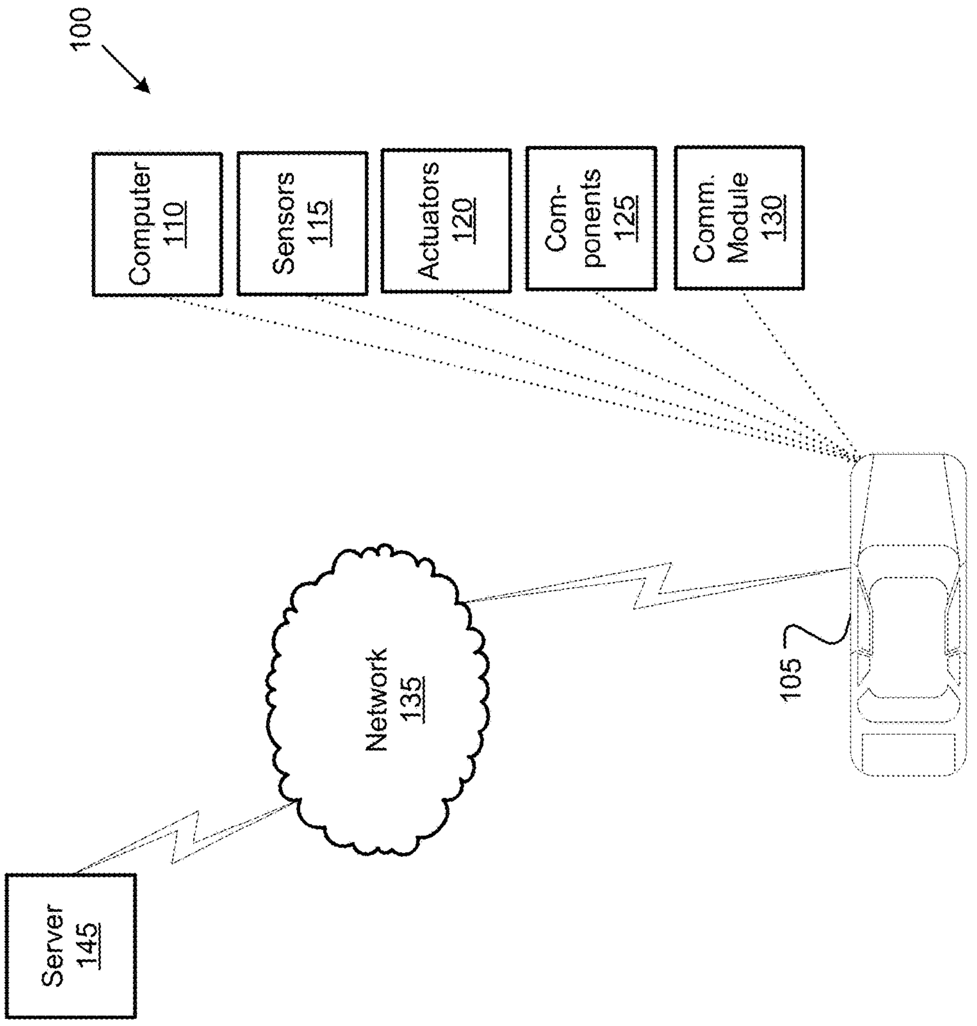
FIG. 1 is a diagram of an example vehicle system.

A system comprises a computer including a processor and a memory, the memory including instructions such that the processor is programmed to: receive at least one of expected upcoming traffic behavior or actual upcoming traffic behavior corresponding to an upcoming segment of a roadway being traversed by a vehicle; adjust a radiator hysteresis timer based on the expected upcoming traffic behavior or the actual upcoming traffic behavior; and transmit a control signal to an actuator to actuate a radiator fan based on the adjusted radiator hysteresis timer.

In other features, the expected traffic behavior comprises an average vehicle speed of vehicles within the upcoming segment of the roadway.

In other features, the processor is further programmed to access a lookup table using the expected traffic behavior to determine an adjustment for the radiator hysteresis timer.

In other features, the processor is further programed to adjust a grille hysteresis timer based on the expected traffic behavior; and transmit a control signal to an actuator to actuate a plurality of vanes based on the adjusted grille hysteresis timer.

In other features, the plurality of vanes actuate between a closed position and an open position to increase airflow for reducing a coolant temperature.

In other features, the plurality of vanes are angularly displaced in a substantially horizontal configuration when the plurality of vanes are in an open position.

In other features, the processor is further programmed to receive the expected traffic behavior from a server.

In other features, the radiator fan is actuated prior to the vehicle entering the upcoming segment.

A method comprises receiving at least one of expected upcoming traffic behavior or actual upcoming traffic behavior corresponding to an upcoming segment of a roadway being traversed by a vehicle; adjusting a radiator hysteresis timer based on the expected upcoming traffic behavior or the actual upcoming traffic behavior; and transmitting a control signal to an actuator to actuate a radiator fan based on the adjusted radiator hysteresis timer.

In other features, the expected traffic behavior comprises an average vehicle speed of vehicles within the upcoming segment of the roadway.

In other features, the method includes accessing a lookup table using the expected traffic behavior to determine an adjustment for the radiator hysteresis timer.

In other features, the method includes adjusting a grille hysteresis timer based on the expected traffic behavior; and transmitting a control signal to an actuator to actuate a plurality of vanes based on the adjusted grille hysteresis timer.

In other features, the plurality of vanes actuate between a closed position and an open position to increase airflow for reducing a coolant temperature.

In other features, the plurality of vanes are angularly displaced in a substantially horizontal configuration when the plurality of vanes are in an open position.

In other features, the method includes receiving the expected traffic behavior from a server.

In other features, the radiator fan is actuated prior to the vehicle entering the upcoming segment.

A system includes means for receiving expected traffic behavior corresponding to an upcoming segment of a roadway being traversed by a vehicle; means for adjusting a radiator hysteresis timer based on the expected traffic behavior; and means for transmitting a control signal to an actuator to actuate a radiator fan based on the adjusted radiator hysteresis timer.

In other features, the expected traffic behavior comprises an average vehicle speed of vehicles within the upcoming segment of the roadway.

In other features, the system includes means for accessing a lookup table using the expected traffic behavior to determine an adjustment for the radiator hysteresis timer.

In other features, the system includes means for adjusting a grille hysteresis timer based on the expected traffic behavior; and means for transmitting a control signal to an actuator to actuate a plurality of vanes based on the adjusted grille hysteresis timer.

Conventional vehicle control systems typically receive internal inputs, such as current vehicle speed, engine temperature, coolant temperature, and the like. Based on the internal inputs, these vehicle control systems cause reactive actions within the vehicle. For example, a vehicle thermal control system can cause reactive thermal actions dependent on coolant temperatures and vehicle speed. The reactive thermal actions can include actuating a radiator fan or actuating a grille assembly to increase airflow for reducing the coolant temperature.

A vehicle's radiator and grille assembly can be actuated according to a hysteresis timer to avoid excessive fluctuations in triggers and actions over a certain time period. However, hysteresis timers as implemented in conventional vehicle control systems can also limit power consumption and/or aerodynamic drag efficiencies. As disclosed herein, a control system managing a thermal state of a radiator can implement a hysteresis timer that is more responsive to vehicle conditions, and provides greater efficiency in vehicle operations.

FIG. 1 is a block diagram of an example vehicle control system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects, etc., relative to the location of the vehicle 105. The vehicle sensors 115 may further include camera sensor(s) 115, e.g. front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control data as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation-such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 includes one or more mechanisms by which a computer 110 may communicate with a server 145. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

The server 145 can be a computing device, i.e., including one or more processors and one or more memories, programmed to provide operations such as disclosed herein. Further, the server 145 can be accessed via the network 135, e.g., the Internet or some other wide area network. The computer 110 can receive and analyze data from sensors 115 substantially continuously, periodically, and/or when instructed by a server 145, etc.

Figure 2A:
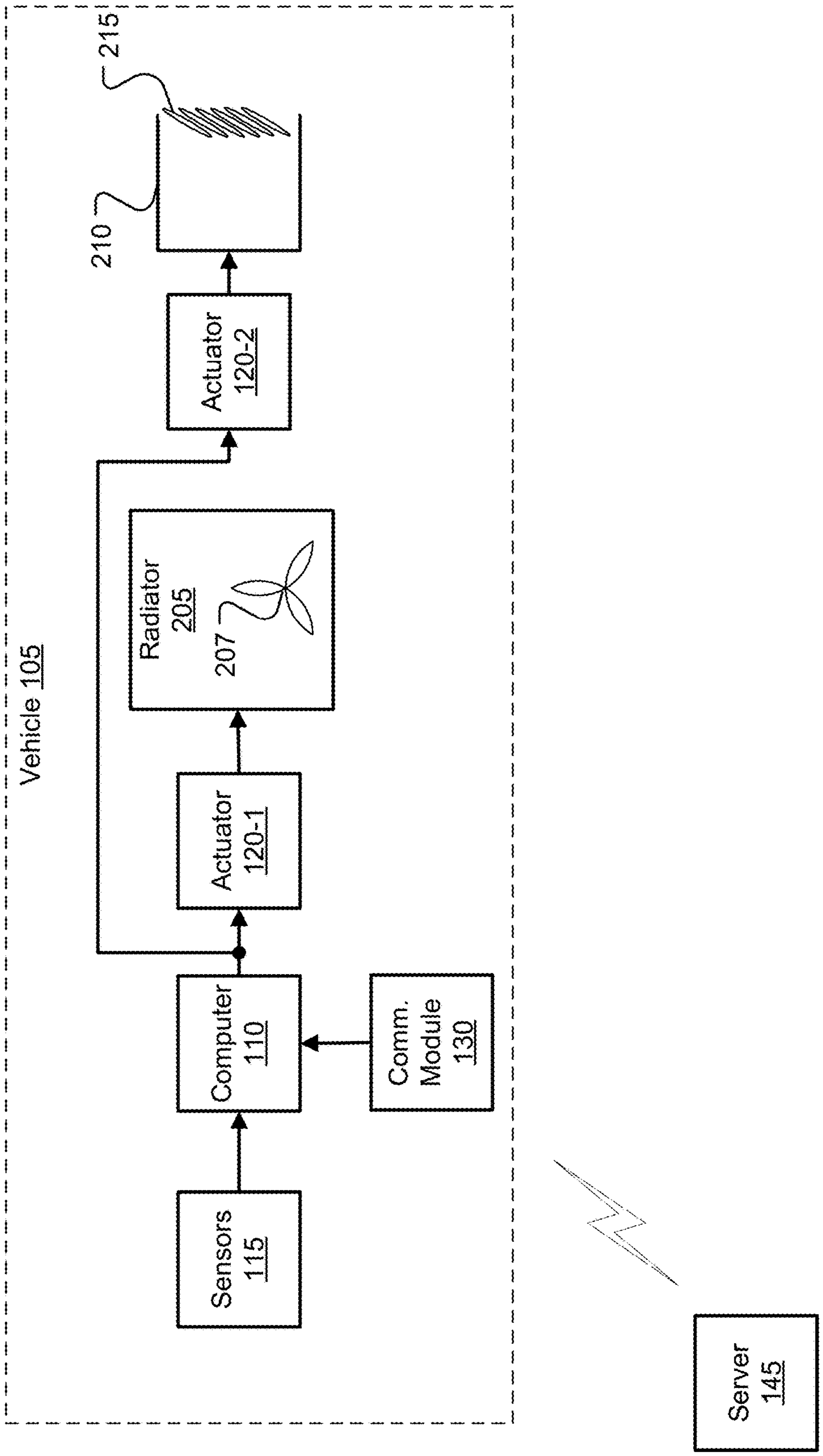
FIGS. 2A and 2B are diagrams illustrating an example dynamic thermal control system.
Figure 2B:
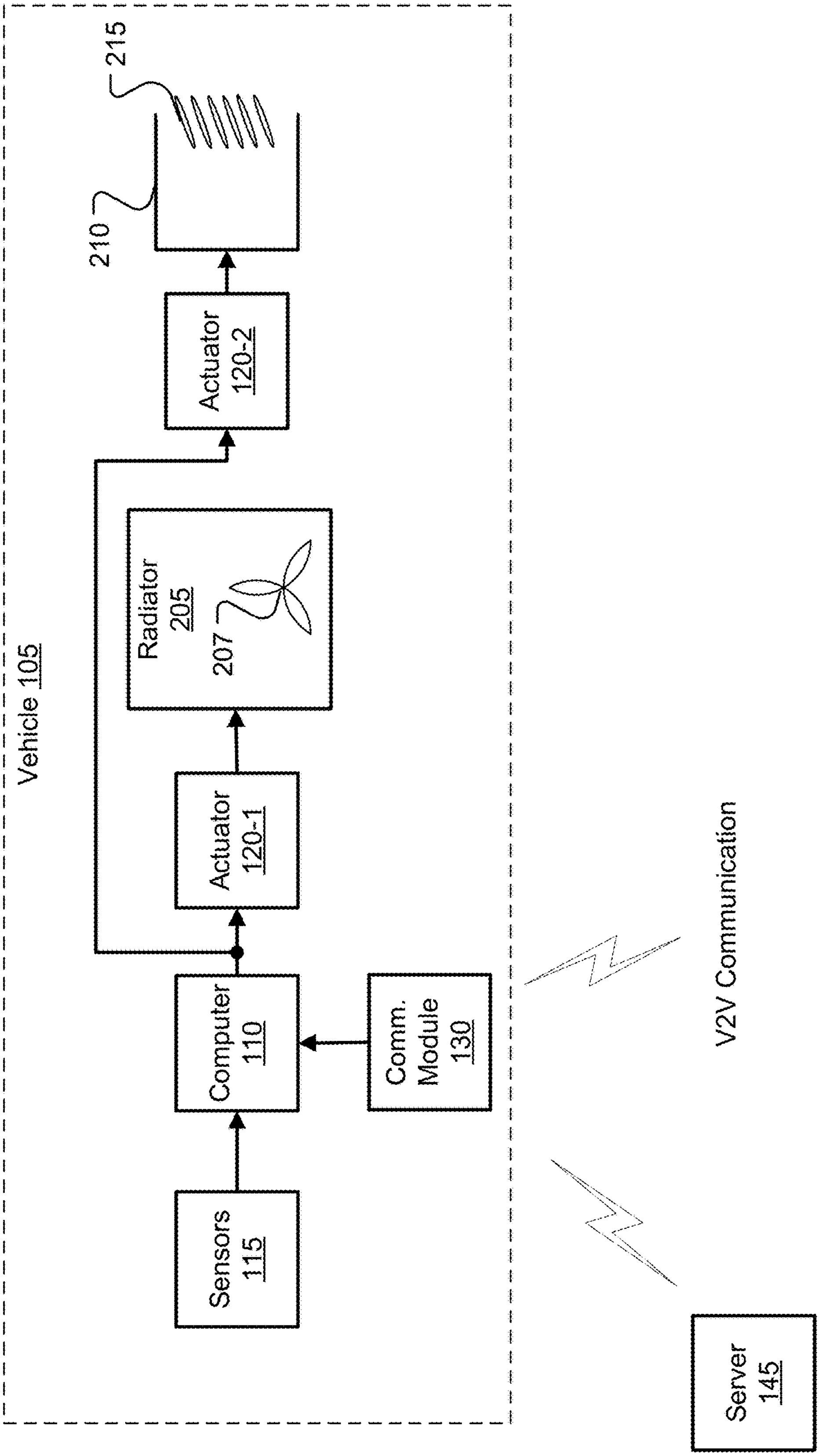

FIGS. 2A and 2B illustrate an example dynamic thermal control system 200 for the vehicle 105. The dynamic thermal control system 200 includes sensors 115, the computer 110, an actuator 120-1, a radiator 205, an actuator 120-2, the communication module 130, and a vane assembly 210.

The radiator 205 can receive coolant from a heat exchanger (not shown) after the coolant has absorbed heat from a pressurized mixture of air and exhaust gas passing through the heat exchanger. The radiator 205 includes a fan 210 that blows air past the heated coolant to decrease the temperature of the coolant. A pump (not shown) can circulate coolant through the heat exchanger and the radiator 205. Based on the vehicle 105 parameters, such as engine temperature, coolant temperature, or the like, the computer 110 transmits a control signal to the actuator 120-1 to operate the radiator 205 fan 210.

The vane assembly 210, which can also be referred to as an active grille shutter (AGS), may be of a conventional type and can be located within an engine compartment of the vehicle 105. The vane assembly 210 includes one or more vanes 215 that are disposed parallel to one another and are retained in a housing 220 located near a grille of the vehicle 105. The vanes 215 are conventionally connected together, and each vane 215 can be angularly displaceable about its longitudinal axis. The angular displacement of the vanes 215 can occur in a synchronous manner to allow the vanes 215 to assume a selected vane position between and inclusive of an open position and a closed position. Based on the vehicle 105 parameters (i.e., measurements of physical phenomena describing a state of the vehicle and/or components thereof), such as engine temperature, coolant temperature, or the like, the computer 110 transmits the control signal to the actuator 120-2 to transition the vanes 215 between a closed position (see FIG. 2A) and an open position (see FIG. 2B). The vanes 215 may also be transitioned to intermediate positions between the open position and the closed position. In some implementations, the computer 110 can control a position of the vanes 215 based on a leading vehicle type. For example, the computer 110 can determine a type of leading vehicle with respect to the vehicle 105 based on sensor 115 data. e.g., radar, lidar, or via V2V communications, or infrastructures, e.g., vehicle-to-infrastructure (V2I) communications. As discussed further below, the computer 110 may use a lookup table or the like that specifies vane 215 positions for respective vehicle parameters.

In an open position, the vanes 215 of vane assembly 210 are angularly displaced in a substantially horizontal configuration to enable the vehicle 105 to draw air into the engine compartment through the grille and vane assembly 210. The drawn air may be used to provide cooling to various components located within the engine compartment such as the vehicle 105 engine. In some instances, however, there is more air entering the engine compartment than is needed for cooling purposes, and that can add aerodynamic drag to the vehicle 105, resulting in greater energy expenditure than would otherwise be needed to move the vehicle 105 forward.

The computer 110 can receive sensor data from the sensors 115 and external data via the communication module 130. The sensor data can include vehicle parameter data, such as vehicle speed, vehicle acceleration, ambient temperature, engine temperature, battery temperature, starting coolant temperature, and current coolant temperature. The sensor data may be referred to as internal inputs to the dynamic thermal control system 200. The external data may comprise data received from the server 145, other vehicles, e.g., V2V communications, or infrastructures, e.g., vehicle-to-infrastructure (V2I) communications. The external data may include expected traffic behavior along a route being traversed by the vehicle 105. Expected traffic behavior can be defined as an expected vehicle speed and/or time in traffic along an upcoming segment of a route being traversed by the vehicle 105.

The route can be determined by a navigation system of the vehicle 105 that determines a mute to traverse between a starting location and a destination location. The server 145 can provide the computer 110 expected and/or actual traffic behavior for upcoming segments along the route. The upcoming segment can be defined as an entire portion of a roadway or a lane of a roadway in the upcoming segment. The server 145 can generate the expected traffic behavior using data from other vehicles currently traveling along the upcoming segment. For example, the server 145 can calculate an average speed of vehicles within the upcoming segment based on vehicle speed data provided by one or more vehicles currently traveling within the upcoming segment. Additionally or alternatively, the server 145 can calculate the expected traffic behavior based on historical data of an average vehicle speed along the upcoming segment during a previous time period. The upcoming segment may be defined as a portion. e.g., the entire portion of the roadway or a particular lane of the roadway, of the route to be traversed by the vehicle 105. The computer 110 can also receive actual traffic behavior, e.g., average vehicle speed, etc., along the upcoming segment via V2V communication and/or V2I communication. The computer 110 can determine average speed by calculating the average speed of collected vehicle speed data.

The expected traffic behavior can also include expected travel time within the upcoming segment. For example, the server 145 may use historical data about the average time it takes to travel a particular section of road at specific times on specific days and real-time data sent by sensors associated with vehicles already in the upcoming segment to determine the expected travel time indicating a time period for the vehicle 105 to travel within the upcoming segment. For instance, the server 145 may use crowdsourcing techniques to calculate the expected travel time for the upcoming segment. That is, the server 145 can receive travel times for an upcoming segment from a plurality of vehicles within a specified period of time, e.g., a proceeding ten minute span, and can then provide an average travel time for the segment based on the received travel times.

The radiator 205 and the vane assembly 210 can be controlled by timers programmed within the computer 110. The timers can be referred to as hysteresis timers that define a time period to operate the fan 207 and/or the vanes 215 based on the passive input from the vehicle 105. For example, a radiator hysteresis timer may define a time period to operate the fan 207 when the vehicle 105 speed is below a defined vehicle speed or the coolant temperature exceeds a defined coolant temperature threshold. A grille hysteresis timer may also be programmed within the computer 110 to control operation of the vanes 215. For example, the grille hysteresis timer may define a time period to transition the vanes 215 from the closed position to the open position or an intermediate position between the closed position and the open position when the vehicle 105 speed is below a defined vehicle speed or the coolant temperature exceeds a defined coolant temperature threshold to increase airflow to the engine compartment.

The computer 110 can transmit a control signal to the actuators 120-1, 120-2 based on the hysteresis timers, e.g., transmit the control signal to actuate the fan 207 or the vanes 215, at a rising edge of the corresponding hysteresis timer, i.e., corresponding to whichever of the fan 207 or vanes 215 of a grilled are being controlled, and a falling edge of the corresponding hysteresis timer. As discussed above, the computer 110 can maintain a radiator hysteresis timer for defining a time period to operate the fan 207 and a grille hysteresis timer to control operation of the vanes 215. The computer 110 can include a first lookup table or the like that relates internal input, e.g., vehicle speed, vehicle acceleration, ambient temperature, engine temperature, battery temperature, starting coolant temperature, and current coolant temperature, to fan 207 speed and/or vane 215 position. For example, the first lookup table may relate a current vehicle speed and/or current coolant temperature to fan 207 speed and/or vane 215 position to control airflow to the engine compartment. The first lookup table can also include the corresponding hysteresis timers that define the time period for activating the fan 207 and/or the maintaining the vanes 215 in a specified position. Table 1 illustrates an example lookup table relating vehicle 105 speed and coolant temperature to fan 207 speed, vane 215 position, and hysteresis timer modifications.

TABLE 1

| Current Vehicle Speed and/or Coolant Temperature | Fan Speed, Vane Position, and/or Hysteresis Timer |
|---|---|
| Speed: 50 miles per hour (MPH)<br>Coolant Temperature: 21° Fahrenheit | Fan Speed: "Low" Setting<br>Vane Opening: 20%<br>Hysteresis Timer: 20 seconds |
| Speed: 20 miles per hour (MPH)<br>Coolant Temperature: 220° Fahrenheit | Fan Speed: "High" Setting<br>Vane Opening: 60%<br>Hysteresis Timer: 20 seconds |

The computer 110 can dynamically modify a time period of a hysteresis timer based on the active inputs, e.g., expected traffic behavior. In an example implementation, the computer 110 can include a second lookup table or the like that relates expected traffic behavior to time period modifications for each hysteresis timer. As discussed above, the computer 110 can calculate the expected traffic behavior using the external data and/or receive the expected traffic behavior from the server 145. The computer 110 can access a record within the second lookup table using the expected traffic behavior, e.g., an average expected speed for an upcoming road segment, and modify the corresponding hysteresis timer according to the accessed record. Once the hysteresis timer(s), e.g., the radiator hysteresis timer and/or the grille hysteresis timer, are modified, the computer 110 generates and transmits the control signal to the actuators 125-1, 125-2 to operate the fan 207 and/or the vane assembly 210 accordingly, which can reduce power consumption and aerodynamic drag with respect to non-modified hysteresis timers. In some implementations, the lookup table(s) can include a vane 215 position based on the leading vehicle type. Based on the determined leading vehicle type, the computer 110 transmits the control signal to actuate the vanes 215 to a position corresponding to leading vehicle type.

While described as a first and a second lookup table, key-value pairs for the first and the second lookup tables may be combined into a single lookup table. For example, the key for a single lookup table can be defined as expected traffic behavior, and the values for the single lookup table can be defined as radiator 205 fan 207 speed and vane 215 position. The values for the lookup table can be empirically determined by a vehicle 105 manufacturer during testing based on maintaining the coolant temperature below a coolant temperature threshold.

Figure 3A:
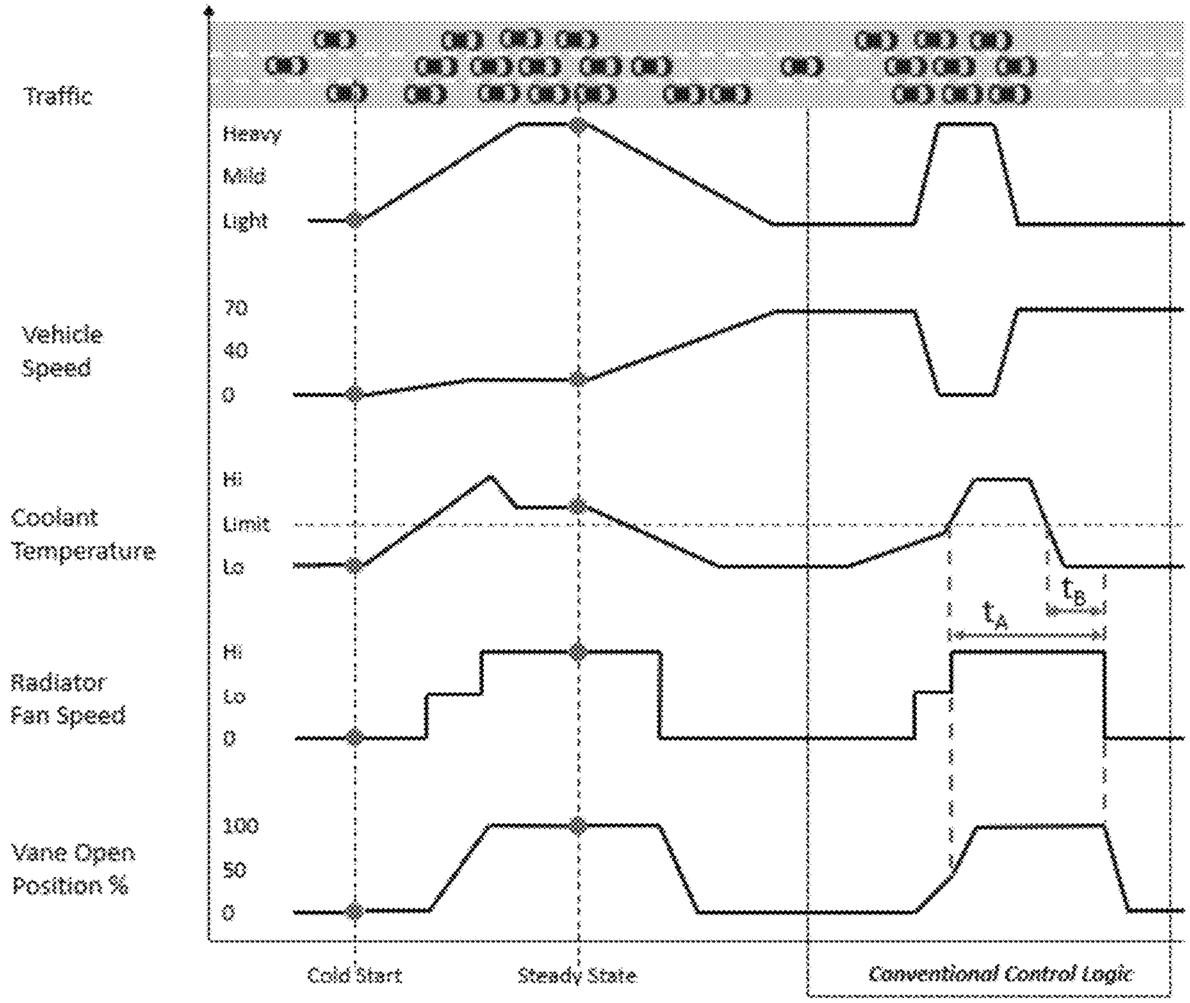
FIG. 3A is an example graph illustrating a radiator fan speed and a vane open position according to a conventional thermal control system.

FIG. 3A illustrates an example diagram for operating a radiator fan and vanes of a vane assembly according to conventional control logic. As shown. FIG. 3A illustrates actual traffic behavior, vehicle speed, coolant temperature, radiator fan speed, and a vane open position as a percentage where zero percent (0%) represents a closed position and one hundred percent (100%) represents an open position. The variable "tA" is defined as a time period to activate the radiator fan to ensure proper cooling under fluctuating speeding conditions, and the variable "tB" is defined as a time period to disengage the radiator fan for a set number of time units after the coolant temperature decreased below the coolant temperature threshold, e.g., coolant temperature limit.

Figure 3B:
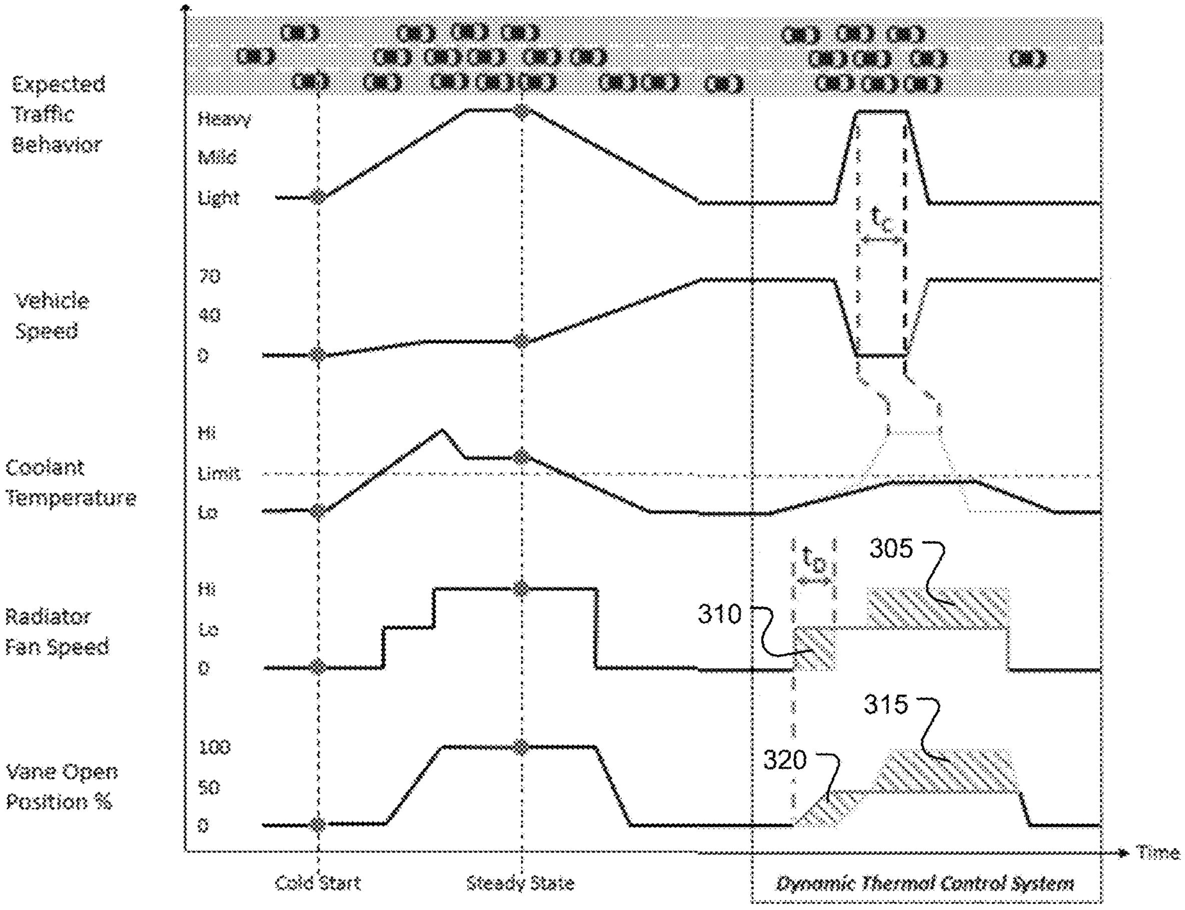
FIG. 3B is an example graph illustrating a radiator fan speed and a vane open position according to the dynamic thermal control system.

FIG. 3B illustrates an example diagram for operating the radiator 205 fan 207 and the vanes 215 of the vane assembly 210 using the dynamic thermal control system 200. As shown. FIG. 3B includes the expected traffic behavior, which can be received from the server 145 and/or determined by the computer 110 as described above. As the vehicle 105 traverses a roadway, the computer 110 can determine that the current vehicle 105 speed will decrease based on an average speed along an upcoming segment of the roadway being less than the current vehicle 105 speed. For example, the computer 110 may determine that the vehicle 105 speed will need to be set to the average speed for the upcoming segment.

Using one or more lookup tables, the computer 110 accesses one or more values corresponding to the expected traffic behavior. As discussed above, the values can be defined as a radiator 205 fan 207 speed and/or vane 215 position to provide an adequate airflow to the engine compartment to maintain the coolant temperature below the coolant temperature threshold. The variable "tC" shown in FIG. 3B is defined as a time during which the coolant temperature increases with conventional control logic. The variable "tD" is defined as a time period to adjust one or more hysteresis timers to precondition the coolant temperature based on the expected coolant temperature change. As discussed above, the key-pair values for the lookup table can be empirically determined by a vehicle 105 manufacturer during testing to maintain the coolant temperature below a coolant temperature threshold.

In this example, the time periods for the radiator hysteresis timer and the grille hysteresis timer are adjusted such that the radiator 205 fan 207 speed is set to a first speed. e.g., low fan speed, at an earlier time with respect to the radiator fan setting illustrated in FIG. 3A. As shown, the radiator 205 fan 207 speed is maintained at the first speed since the radiator hysteresis timer was adjusted to cause the radiator 205 fan 207 to begin at an earlier time period relative to FIG. 3A. An area 305 represents energy conservation since the radiator 205 fan 207 did not get adjusted to a second speed, e.g., high fan speed, with respect to FIG. 3A. An area 310 represents an energy consumption increase due to the radiator 205 fan 207 being initiated at an earlier time period relative to the example illustrated in FIG. 3A. As shown, the computer 110 also adjusted the vanes 215 to an intermediate position at an earlier time with respect to conventional control logic, and an area 315 represents aerodynamic drag conservation with respect to a position of the vanes illustrated in FIG. 3A. An area 320 represents an aerodynamic drag increase experienced by the vehicle due to the vanes 215 being transitioned from a closed position to an intermediate position at an earlier time with respect to the conventional control logic. As shown, overall energy consumption and aerodynamic drag are conserved relative to the conventional control logic shown in FIG. 3A.

Figure 4:
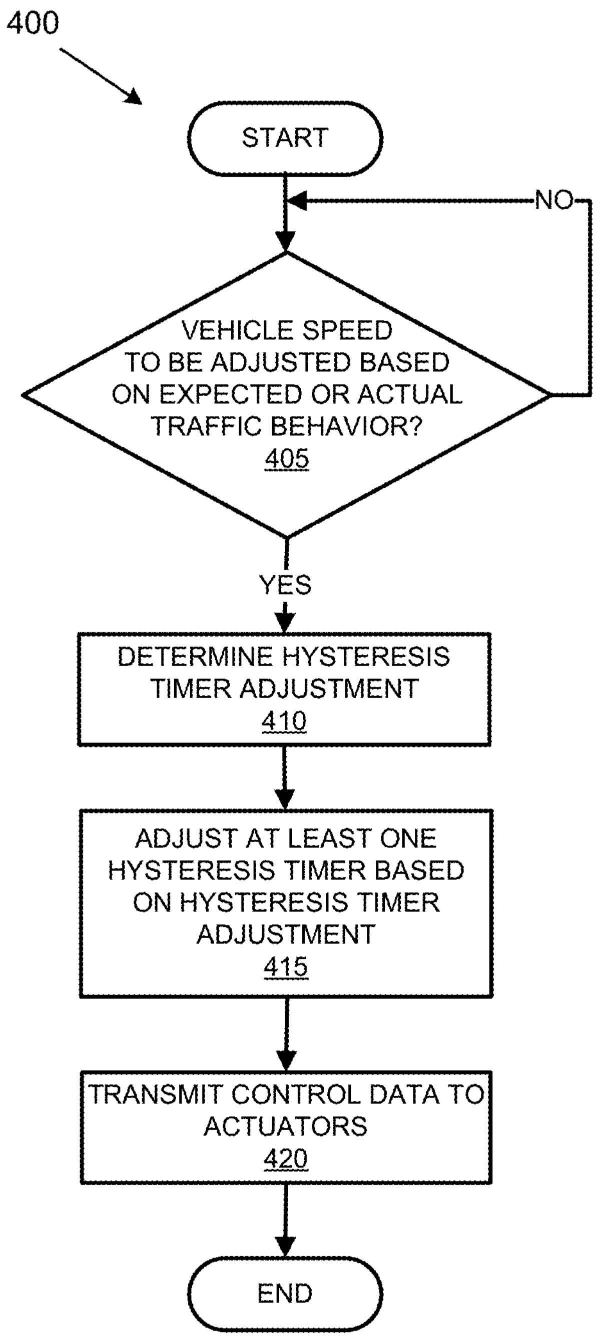
FIG. 4 is a flow diagram illustrating an example process for determining whether to modify one or more hysteresis timers based on expected traffic behavior.

FIG. 4 is a flowchart of an exemplary process 400 for determining whether to modify one or more hysteresis timers based on expected traffic behavior. Blocks of the process 400 can be executed by the computer 110. The process 400 begins at block 405 in which a determination is made whether a vehicle 105 speed is to be adjusted based on expected and/or actual traffic behavior. The computer 110 can determine whether a speed of the vehicle 105 will be adjusted based on expected and/or actual traffic behavior. For example, the computer 110 can determine that the vehicle 105 speed will be adjusted prior to traversing an upcoming segment of roadway when an average speed at the upcoming segment is less than the current vehicle 105 speed.

If the vehicle 105 speed will not be adjusted, the process 400 returns to block 400. Otherwise, at block 410, the computer 110 determines a hysteresis timer adjustment. The hysteresis timer adjustment can be defined as a time period to adjust the radiator hysteresis timer and/or the grille hysteresis timer. In an example implementation, the computer 110 accesses one or more lookup tables or the like to obtain a value corresponding to the expected traffic behavior. The value can include an hysteresis timer adjustment for one or both of the radiator hysteresis timer and the grille hysteresis timer.

At block 415, the computer adjusts at least one of the radiator hysteresis timer or the grille hysteresis timer according to the hysteresis timer adjustment. In an example implementation, the radiator hysteresis timer and/or the grille hysteresis timer are adjusted so that the coolant temperature is preconditioned prior to the vehicle 105 entering the upcoming segment. Preconditioned can be defined as adjusting at least one of the radiator hysteresis timer or the grille hysteresis timer such that a rising edge of the adjusted hysteresis timer is set at an earlier time period than the non-adjusted hysteresis timer.

At block 420, the computer 110 transmits the control signal to at least one of the actuators 125-1, 125-2 according to the rising edge of the adjusted hysteresis timer(s). The computer 110 can transmit the control signal to actuate at least one of the radiator 205 fan 207 and/or the vanes 215 according to the rising edge of the hysteresis timer. The process 400 then ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PISQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:

determine a time period of a radiator hysteresis timer based on internal input;

receive at least one of expected upcoming traffic behavior or actual upcoming traffic behavior corresponding to an upcoming segment of a roadway being traversed by a vehicle;

adjust the time period of the radiator hysteresis timer based on the expected upcoming traffic behavior or the actual upcoming traffic behavior; and transmit a control signal to an actuator to actuate a radiator fan for the adjusted time period of the radiator hysteresis timer.

2. The system of claim 1, wherein the expected traffic behavior comprises an average vehicle speed of vehicles within the upcoming segment of the roadway.

3. The system of claim 1, wherein the processor is further programmed to access a lookup table using the expected traffic behavior to determine the adjusted time period for the radiator hysteresis timer.

4. The system of claim 1, wherein the processor is further programmed to:

determine a time period of a grille hysteresis timer;

adjust the time period of the grille hysteresis timer based on the expected traffic behavior; and transmit a control signal to an actuator to open a plurality of vanes for the adjusted time period of the grille hysteresis timer.

5. The system of claim 4, wherein the plurality of vanes actuate between a closed position and an open position to increase airflow for reducing a coolant temperature.

6. The system of claim 4, wherein the plurality of vanes are angularly displaced in a substantially horizontal configuration when the plurality of vanes are in an open position.

7. The system of claim 1, wherein the processor is further programmed to receive the expected traffic behavior from a server.

8. The system of claim 1, wherein the radiator fan is actuated prior to the vehicle entering the upcoming segment.

9. A method comprising:

determining a duration of a radiator hysteresis timer based on internal input;

receiving at least one of expected upcoming traffic behavior or actual upcoming traffic behavior corresponding to an upcoming segment of a roadway being traversed by a vehicle;

adjusting the time period of the radiator hysteresis timer based on the expected upcoming traffic behavior or the actual upcoming traffic behavior; and transmitting a control signal to an actuator to actuate a radiator fan for the adjusted time period of the radiator hysteresis timer.

10. The method of claim 9, wherein the expected traffic behavior comprises an average vehicle speed of vehicles within the upcoming segment of the roadway.

11. The method of claim 9, further comprising accessing a lookup table using the expected traffic behavior to determine the adjusted time period for the radiator hysteresis timer.

12. The method of claim 9, further comprising:

determining a time period of a grille hysteresis timer;

adjusting the time period of the grille hysteresis timer based on the expected traffic behavior; and transmitting a control signal to an actuator to open a plurality of vanes for the adjusted time period of the grille hysteresis timer.

13. The method of claim 12, wherein the plurality of vanes actuate between a closed position and an open position to increase airflow for reducing a coolant temperature.

14. The method of claim 13, wherein the plurality of vanes are angularly displaced in a substantially horizontal configuration when the plurality of vanes are in an open position.

15. The method of claim 9, further comprising receiving the expected traffic behavior from a server.

16. The method of claim 9, wherein the radiator fan is actuated prior to the vehicle entering the upcoming segment.

17. A system comprising:

means to determine a time period of a radiator hysteresis timer based on internal input;

means for receiving at least one of expected upcoming traffic behavior or actual upcoming traffic behavior corresponding to an upcoming segment of a roadway being traversed by a vehicle;

means for adjusting the time period of the radiator hysteresis timer based on the expected upcoming traffic behavior or the actual upcoming traffic behavior; and means for transmitting a control signal to an actuator to actuate a radiator fan for the adjusted time period of the radiator hysteresis timer.

18. The system of claim 17, wherein the expected traffic behavior comprises an average vehicle speed of vehicles within the upcoming segment of the roadway.

19. The system of claim 17, further comprising means for accessing a lookup table using the expected traffic behavior to determine the adjusted time period for the radiator hysteresis timer.

20. The system of claim 17, further comprising:

means to determine a time period of a grille hysteresis timer;

means for adjusting the time period of the grille hysteresis timer based on the expected traffic behavior; and means for transmitting a control signal to an actuator to open a plurality of vanes for the adjusted time period of the grille hysteresis timer.

* * * * *